Feb. 21, 1939.  Q. E. CONNER  2,147,883
EXPANDING BEARING PIN
Filed March 15, 1937  2 Sheets-Sheet 1
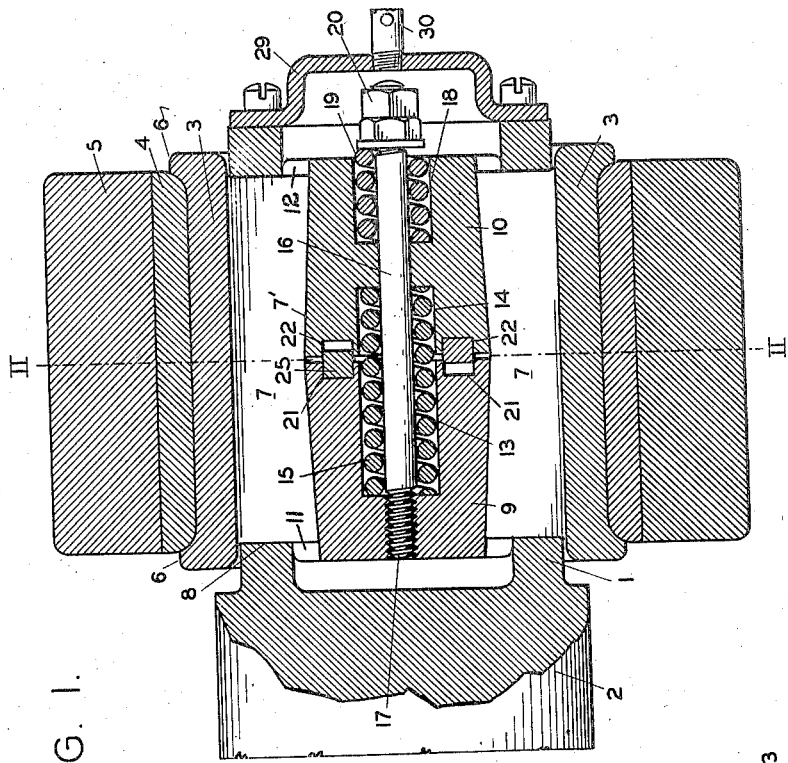
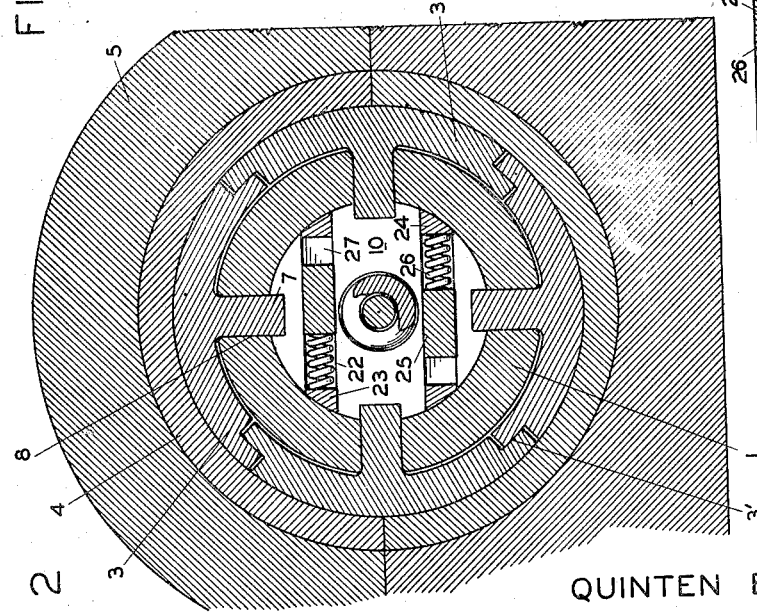
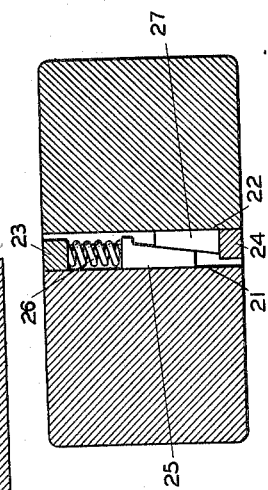
INVENTOR:
QUINTEN E. CONNER
BY Baldwin Vale
ATTORNEY Patented Feb. 21, 1939

2,147,883

UNITED STATES PATENT OFFICE 2,147,883

EXPANDING BEARING PIN

Quinten E. Conner, San Francisco, Calif.

Application March 15, 1937, Serial No. 130,924

4 Claims. (Cl. 308—64)

This invention relates to improvements in expanding bearing pins.

Among the objects of this invention is to reduce maintenance expense of mechanical equipment by minimizing labor costs for taking up worn bearings.

Another object is to provide a bearing pin suitable for use in installations having heavy bearing pressures.

Another object is to provide a bearing pin which will automatically expand to progressively take up wear in the bearing as it occurs.

Another object is to lock the bearing pin in expanded position as its expansion progresses so as to prevent the bearing pin yielding and contracting under pressure.

Another object is to prevent the automatic expansion of the bearing pin beyond a given extent.

Another object is to provide simple manual means for allowing further limited automatic expansion of the bearing pin after the pin has expanded to the extent originally permitted.

Another object is to insure adequate lubrication of the bearing surfaces.

A further object is to provide a bearing pin sturdy of construction and permanently reliable in operation.

Other objects and advantages appear as this description progresses.

In this specification and the accompanying drawings the invention is disclosed in its preferred form. It is to be understood, however, that it is not limited to this specific form because it may be embodied in modifications within the purview of the claims following the description.

In the two sheets of drawings:

Fig. 1 is a longitudinal vertical section of a bearing pin constructed in accordance with this invention.

Fig. 2 is a transverse vertical section of the same taken along the line II—II in Fig. 1.

Fig. 3 is a fragmentary detail view in horizontal section showing the locking means for holding the pin in expanded position against bearing pressure.

Figure 4:
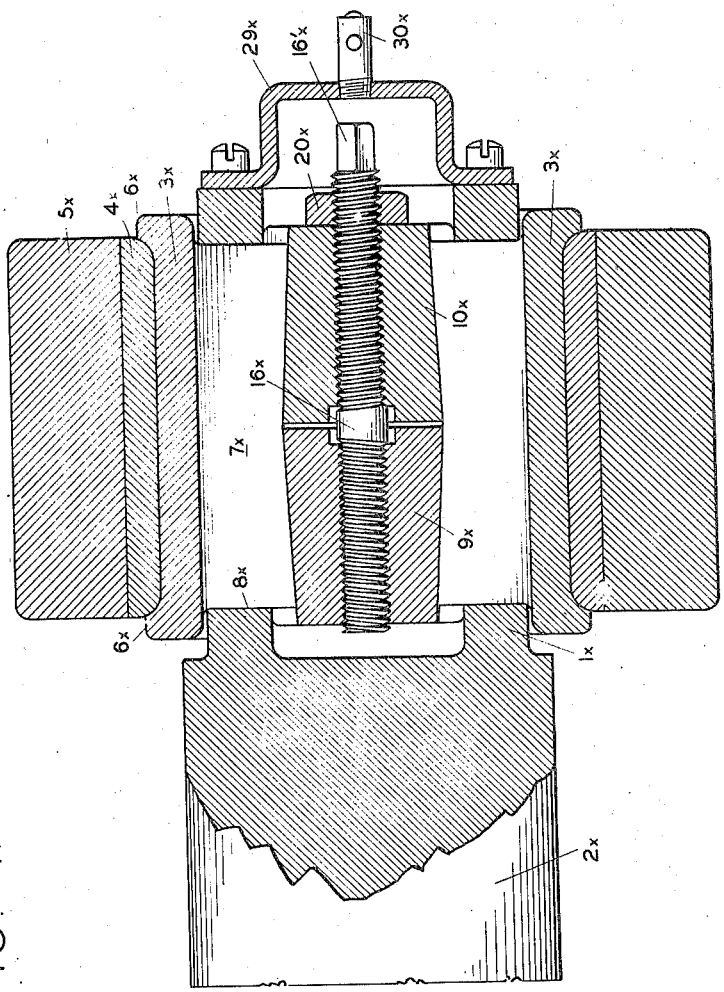
Fig. 4 is a view similar to Fig. 1 of a modified form of the invention embodied in a bearing pin which is manually adjustable to take up wear.

In detail the construction, illustrated in the drawings referring more particularly to Figs. 1 and 2, comprises the trunnion sleeve 1 projecting laterally from the member 2. In the present instance, the member 2 is a rotating member. It might, of course, be a stationary bracket in other applications of the invention.

The bearing segments 3 slidably engage the bushing 4 fixed within the bracket 5. The adjoining ends of the bearing segments have the interlocking step cuts 3' therein to prevent any incidental chattering thereof. The segments may be provided with the lips 6—6 to prevent longitudinal movement within the bushing should no other provision have been made for incidental lateral thrust. The segments have the central radial anchor lugs 7 extending through the slots 8 in the sleeve 1. The inwardly disposed sides of the lugs 7 are provided with the V-shaped cam surfaces 7'.

The cylindrical blocks 9 and 10 are slidable within the sleeve 1 and have the grooves 11 and 12 engaging the ends of the lugs 7. The bottoms of the grooves are inclined upwardly to coincide with the slopes of the V-shaped cam surfaces 7'. The blocks are recessed at 13, 14 to receive the spring 15 which expands therebetween. The blocks, when urged apart by the expansion of the spring 15, co-act with the V-shaped ends of the lugs 7 and move the segments 3 outward into frictional engagement with the bushing 4. The tension of the spring 15 is such that the outward force exerted on the segments 3 is somewhat less than the mean opposed force thereon applied by the bearing bushing 4. This prevents the segments 3 expanding unduly and insures the proper working clearance being maintained in the bearing.

The axial stem 16 is threaded at 17 in the block 9 and slidably extends through the block 10. The block 10 has the recess 18 therein to receive the spring 19 which expands outwardly against the washer and lock nut assembly 20 on the end of the stem 16. The spring 19 tends to urge the blocks 9 and 10 together counter-acting the effect of the spring 15. In assembling the apparatus, the lock nut assembly 20 is adjusted so that the spring 19 exerts less pressure than the spring 15. The springs, however, are so designed that the spring 19 requires more force to compress it a given distance than does the spring 16. This difference in design of the two springs is an important factor in the operation of the invention, later to be described.

The abutting ends of the blocks have the opposed grooves 21—22, 21—22 therein, see also Fig. 3. The ends of these grooves are closed by the stops 23 and 24. The wedges 25 in the grooves 21 are backed up by the springs 26 expanding against the stops 23. These wedges co-operate with the wedges 27 which occupy positions against the stops 24. It is required that the tangent of the angle of the wedges with respect to the transverse plane be less than the value of the coefficient of the friction therebetween. Thus designed, the wedges positively hold the blocks 9, 10 apart no matter what force is exerted tending to bring them together.

The end of the sleeve 2 is closed by the plate 29 which has the usual coupling 30 therein for high pressure lubrication. The lubricant admitted within the sleeve 2 works its way through the slots 8 and the crevices between the bearing segments 3 on to the surface of the bushing 4.

The invention operates substantially as follows: The spring 15 exerts a greater force against the blocks 9, 10 than the spring 19 as previously described. There consequently is a net resilient force urging the blocks apart. Thus, as wear occurs in the bearing, the segments 3 are moved outward by the inclined grooves 11, 12 engaging the V-shaped cam surface 7' on the lugs 7.

As the blocks are progressively moved apart in compensating for the bearing wear, the springs 26 synchronously urge the wedges 25 further into operative engagement with the wedges 27. This prevents the friction segments 3 from contracting once they have been automatically expanded as above described. The spring 15 is thus relieved from the work of maintaining the segments 3 expanded and performs only the work of actually expanding the segments.

After the bearing pin has been expanded a given amount, the expansion of the spring 15 and the corresponding compression of the spring 19 renders the forces of these two springs substantially equal. There then is no net force urging the blocks apart. The bearing pin, consequently, can be expanded no further. This limiting of the possible expansion of the bearing pin insures against any undue expansion which might cause excessive friction in the bearing. The lessening of the expansive tendency of the bearing pin as the tensions of the springs 15, 19 approach equality insures an adequate working clearance being maintained after the bearing has been initially worked in.

After the bearing pin has expanded to the limit above described, further wear would render the bearing loose. The lock nut assembly 20 on the stem 16 may then be adjusted so as to lessen the tension of the spring 19. This enables the spring 15 to again exert an effective force urging the blocks 9 and 10 apart. The automatic expansion operation is then repeated exactly in the manner before described.

Fig. 4 illustrates a modified form of the invention in which the bearing pin is expanded manually to compensate for bearing wear. Parts corresponding to those described in the preferred embodiment are indicated by similar reference numerals bearing the suffix "$x$".

The stem $16x$ has left and right hand threads therein engaging the blocks $9x$ and $10x$ respectively. The bearing is expanded by loosening the lock nut $20x$ and turning the stem $16x$ in a clockwise direction by the square end $16'x$. This moves the blocks $9x$ and $10x$ apart thus expanding the bearing segments $3x$ in the manner described in connection with the preferred form. After the bearing pin is expanded the requisite amount, the lock nut $20x$ is again tightened locking the segments against contraction. The wedges interposed between the blocks 9 and 10 can be omitted in this modified form of the invention.

Having thus described the invention, what is claimed and desired to be secured by Letters Patent is:

1. A bearing pin including a plurality of circularly arranged bearing segments; inwardly disposed V-shaped cam surfaces projecting from said segments; blocks cooperating with said cam surfaces and adapted to move said segments outward when moved apart; resilient means urging said blocks apart and wedge means interposed between said blocks and arranged to prevent movement of said blocks toward each other.

2. A bearing pin including a plurality of circularly arranged bearing segments; inwardly disposed V-shaped cam surfaces projecting from said segments; blocks cooperating with said cam surfaces and adapted to move said segments outward when moved apart; resilient means urging said blocks apart; and means for preventing further movement after said blocks have been moved apart a predetermined extent.

3. A bearing pin including a plurality of circularly arranged bearing segments; inwardly disposed V-shaped cam surfaces projecting from said segments; blocks cooperating with said cam surfaces and adapted to move said segments outward when moved apart; a spring urging said blocks apart; and a second spring adapted to be tensioned by the movement of said blocks apart until its thrust is equal to the thrust of the first spring.

4. A bearing including a plurality of circularly arranged bearing segments; inwardly disposed V-shaped cam surfaces projecting from said segments; blocks cooperating with said cam surfaces and adapted to move said segments outward when moved apart; resilient means urging said blocks apart; a pair of wedges interposed between said blocks and arranged to prevent movement of said blocks toward each other when once moved apart; and spring means urging said wedges into operative engagement with each other.

QUINTEN E. CONNER.